(12) United States Patent
Lawson et al.

(10) Patent No.: US 6,185,613 B1
(45) Date of Patent: *Feb. 6, 2001

(54) SYSTEM AND METHOD FOR GLOBAL EVENT NOTIFICATION AND DELIVERY IN A DISTRIBUTED COMPUTING ENVIRONMENT

(75) Inventors: Todd C. Lawson, Lindon; Warren D. Cave, Orem; Dean L. Schmidt, Lindon, all of UT (US)

(73) Assignee: NetVision, Inc., Orem, UT (US)

( * ) Notice: Under 35 U.S.C. 154(b), the term of this patent shall be extended for 0 days.

This patent is subject to a terminal disclaimer.

(21) Appl. No.: 09/080,364

(22) Filed: Feb. 24, 1998

Related U.S. Application Data

(63) Continuation-in-part of application No. 08/725,393, filed on Oct. 3, 1996, now Pat. No. 5,721,825.

(60) Provisional application No. 60/013,471, filed on Mar. 15, 1996, now abandoned.

(51) Int. Cl.[7] .................................................. G06F 15/173
(52) U.S. Cl. ........................................... 709/224; 709/225
(58) Field of Search ..................................... 709/224, 225

(56) References Cited

U.S. PATENT DOCUMENTS

| 5,355,484 | * | 10/1994 | Record et al. ........................ 395/704 |
| 5,430,875 | * | 7/1995 | Ma ........................................ 709/318 |
| 5,592,664 | * | 1/1997 | Starkey .................................... 707/1 |
| 5,621,892 | * | 4/1997 | Cook .................................... 709/224 |
| 5,721,825 | * | 2/1998 | Lawson et al. ..................... 709/203 |

* cited by examiner

Primary Examiner—Krisna Lim
(74) Attorney, Agent, or Firm—Kirton & McConkie; Michael F. Krieger

(57) ABSTRACT

A system in method for global event notification in a distributed computer environment is presented. The system and method utilizes a local event registry to identify local event consumers that should be notified when an event occurs. The system and method also utilizes a global event registry which identifies other servers which need notification when an event occurs. These other servers will then, in turn, notify their local event consumers of the event. The system and method incorporates multiple levels of filtering to allow event consumers to remove notification of events having little or no interest. The system and method also ensures that duplicate event notifications are not received for the same event.

15 Claims, 7 Drawing Sheets

SYSTEM AND METHOD FOR GLOBAL EVENT NOTIFICATION AND DELIVERY IN A DISTRIBUTED COMPUTING ENVIRONMENT

RELATED APPLICATION

This Application claims the benefit of U.S. Provisional Application Ser. No. 60/013,471, now abandoned, entitled "Global Event Delivery Method," filed on Mar. 15, 1996, and is incorporated herein by reference.

This Application is a Continuation-in-Part and claims the benefit of U.S. patent application Ser. No. 08/725,393, entitled "Global Event Delivery Method and Apparatus Using a Distributed Computing Environment," filed on Oct. 3, 1996, now issued as U.S. Pat. No. 5,721,825, on Feb. 24, 1998.

BACKGROUND OF THE INVENTION

1. Field of the Invention

This invention relates to event notification and distribution between computer systems, and more specifically to global event notification in a distributed computing environment, such as a computer network.

2. Prior State of the Art

Distributed computing environments are typically made up of several systems and resources. For example, Local Area Networks (LAN), Wide Area Networks (WAN), and other types of computer networks typically involve many computer systems connected together via physical communication links. Many networks comprise two or more interconnected servers. User or client systems then attach to one or more of these servers. In addition, servers may have attached peripherals which are available to users of the network. For example, many office networks have various devices which are available to all users of the network, such as printers, fax machines, modems, and the like.

In order to share information and resources among the various systems in a computer network, systems must be able to discover the status of other systems or devices in the network. For example, when a file is to be printed by a network printer, the file must be transferred to the server which is responsible for printing; typically the server physically attached to the printer. Before such a transfer takes place, it may be desirable to discover or ascertain the status of the network printer. For example, if the network printer is off-line or otherwise unavailable, there would be little benefit to transferring a file to the printer for printing. As another example, after a file is finished printing, it may also be desirable to inform the user that the print job is completed. Thus, in a distributed computing environment there is a need for systems to be able to discover when certain events happen on other systems. Although such a mechanism was once accomplished by polling (requesting the status of other systems), today's modem architectures utilize an event notification procedure.

In an event notification procedure, when an event occurs that should be known by other systems, the system where the event occurs sends a message to the other systems to notify them of the event. This notification can be called "event notification" and is typically accompanied by a message packet containing data associated with the event. In a computer network, systems or processes which produce events can be referred to as "event producers" and systems or processes which should be notified of the event can be called "event consumers."

When an event consumer receives notification that a certain event happened on an event producer, the event consumer can take appropriate action. In the case of one example given above, if the network was set up to notify a user when a file had finished printing, after the file had been printed, the server responsible for printing the file would generate an event notification that printing had finished. This event notification would then be passed to the user to notify the user that printing had concluded.

By its very nature, event notification is a local phenomenon. In other words, an event producer notifies event consumers of events which happen locally to the event producer. Event consumers which desire to receive notification of certain events "register" with the event producing system. When an event occurs, notification is sent to all registered event consumers.

Although such an event notification system provides many benefits and advantages, it also has many shortcomings and drawbacks. For example, event notification processes arc typically single-thread execution processes. This means that when an event occurs, a process begins running on the event producing system which contacts each registered event consumer and notifies them of the event. The registered event consumers are contacted, one after the other, until all event consumers have been notified. This tends to create a situation where the event producing system is prevented from performing other tasks until all event consumers have been notified.

Because a connection must be established between the event producer and the event consumers, a situation can arise where a large amount of message traffic is created on the computer network. Thus, it is important to minimize the time it takes to contact each event consumer and minimize the amount of message traffic generated on the network.

Another problem with current event notification systems is the inability to generate global event notification. As previously discussed, by its very nature, event notification is a localized phenomenon. In other words, an event producer notifies all event consumers that are registered for a particular event. Thus, an event consumer that desired notification of all events of a particular type must register for the event at each server. For example, consider a situation where a network comprises three servers, server A, server B, and server C. Server A and server B each have a network printer attached thereto. A user on server C desires to know when any file he prints from either printer is completed. In such a situation, the user must register for a print job finished type event at both server A and server B. Failure to register for events on both servers will create the possibility of missing a desired event. In large networks with many events of interest, registering for events on each and every server can be a time consuming and cumbersome process. It would, therefore, be an advancement in the art to provide global event notification across an entire network without the need to register at each server.

Another problem with prior art event notification systems is that events tend to be broadcast events. This results in sending a large number of event notifications that are of little or no interest to the event consumer. As previously described, an event producer will contact all registered event consumers and notify them of the event. Many events, however, are of little or no interest to many registered users. For example, suppose a system had a create object event. Now suppose an event consumer wished to be notified when a directory object on a certain system disk was created. Under prior art event notification systems, this event consumer would register for the create object event. This would have the effect of not only notifying the event consumer of a directory object created on the particular disk of interest, but also of every other object created on any disk. Thus, this event consumer would receive many notifications that were of no interest. It would, therefore, be advantageous to be able to register only for events meeting certain criteria.

A still further problem with prior art notification systems can be identified by considering the following example. Many network environments contain a large database of shared data. Such a database can contain, for example, the log-in names and passwords of all users who are authorized to connect to the network. A wide array of other information may also be associated with such user account information. Such information can include a user's full name, an address, billing numbers, department, or any other type of information. In order to allow all servers on the network to know which resources are available on the network, such a database also often contains network device information such as a listing of the computer servers in the network and attached peripherals such as mass storage devices, printers, modems, and the like.

Experience has shown that as networks grow to hundreds, thousands, or tens of thousands of systems and users, the size of such a database becomes larger than any one system can store and maintain. In such a situation, the database is often broken up and scattered among various servers in the network. Thus, server A may contain part 1 of the database, server B may contain part 2 of the database, and server C may contain part 3 of the database.

Sometimes, in order to provide redundancy and prevent loss of the database, portions of the database are replicated on different systems. For example, server A may contain parts 1 and 3 of the database. Server B may contain parts 2 and 1 of the database, and server C may contain parts 3 and 2 of the database. In such a configuration, if any single system is lost, the remaining systems still have an entire copy of the database.

While breaking the database up among systems helps to provide robustness and eliminates the problem of having a single database on one system, it also creates several problems for event notification systems. Because event notification is a local phenomenon, if an event consumer wishes to be notified when a user is added to the system, the event consumer must be registered with enough servers to ensure connections to all parts of the database. This is because if the event consumer only registers with Server A, then in the example given above, the event consumer will only be notified if parts 1 and 3 are changed. If, in this example, part 2 of the database was changed, then an event would not be generated by Server A and the event consumer would not be notified. Prior art systems therefore require registration with a plurality of servers in order to effect notification if any portion of the database is changed. This results in multiple or redundant notifications for a single event. This can be illustrated by the following example.

Suppose part 1 of the database was changed. Further suppose that an event consumer who wished to be notified of changes in the database registered with Server A (containing parts 1 and 3 of the database) and Server B (containing parts 2 and 1 of the database). When Server A modifies part 1 of the database, Server A will send notification of this event to the event consumer registered for the database modification event. In order to synchronize part 1 of the database on server A with part 1 of the database on server B, server A will send a message to server B so that server B can update its copy of part 1 of the database. When server B updates its part 1 of the database, however, it will realize that an event consumer has registered for the database modification event and send notification to the event consumer of the modification of part 1 of the database located on server B. Thus, the event consumer receives two notifications for a single modification, one from server A and one from server B. It would, therefore, be advantageous to have an event notification system which could eliminate duplicate events so that only a single notification is sent to registered event consumers.

Finally, prior art event notification systems lack certain functionality that is highly desirable. For example, current event notification systems do not provide a mechanism for an event producer who is also a user to trigger a customized event. Thus, it would be desirable to allow event producers, including event producers that are also users, to trigger custom events that can be globalized to all event consumers in the network.

In addition to the ability to trigger custom events, it would also be desirable to provide events that are directed. As previously described, prior art event notification systems notify all registered users of a particular event. Thus, there is currently no mechanism to allow an event to be directed to a specific event consumer to the exclusion of all other event consumers, even though the other event consumers have registered for a particular event. It would be an advancement in the art to provide this capability.

BRIEF SUMMARY AND OBJECTS OF THE INVENTION

The foregoing problems in the prior state of the art have been successfully overcome by the present invention, which is directed to a system and method for globalizing event notifications in a distributed computing environment. The current system and method can be used with virtually any underlying event notification system. In one preferred embodiment, the present invention is designed to work in conjunction with current event notification systems to achieve the desired functionality.

The present invention presumes an underlying event notification system which: (1) allows local event consumers to register for notification of an event, and (2) sends notification of events that occur to registered local event consumers. In addition, it is desirable for some embodiments of the present invention to allow registration of custom event types. If an underlying event notification system does not provide the ability to register locally for an event, does not send even notifications to locally registered event consumers, or does not allow registration of custom event types, then this functionality can be provided as part of the present invention.

The present invention achieves global event notification by storing a global event registry comprising a list of events and a corresponding list of servers which need notification when the corresponding event occurs. In addition to the global registry, each server stores a local event registry comprising a list of events and a corresponding list of local event consumers that need notification when an event occurs. The basic event globalization process utilized these two registries to globalize events as follows:

Each server has running thereon a local event globalization process that registers for events desired by local event consumers. When an event consumer registers for an event, the event globalization process of the event consumer's local server places an entry into the local event registry for the local server. An entry is also placed into the global event registry for the local server where the event consumer is located. Thus, the global event registry is updated to contain an entry identifying the server where the event consumer is located and the desired event and the local event registry of that server is updated to identify the event consumer and the desired event.

When a local event globalization process receives notification of an event that has occurred locally, the local process looks in the local registry in order to identify local event consumers that need notification of the event. This process then transfers the event to any identified local event consumers. In addition, the process checks the global event registry to identify any additional servers which also need notification of the event. This process then sends the event to the corresponding event globalization process running on the identified servers. These corresponding event globalization processes, in turn, check their local event registries and provide the event to any event consumers identified therein. In this way, local events can be routed to any event consumer in the network without the need to register at each server.

The present invention handles the problem of duplicate event notifications by utilizing an indicator field or information field in the event. In other words, when an event occurs on a server because the event originated there, the event is marked with an indicator identifying it as an original event. When an event occurs on a server because of another event which occurred on a different server, the event is marked with an indicator identifying it as a duplicate event. Thus, this identifier allows the event globalization process to distinguish between original events and duplicate events. Duplicate events are removed without forwarding notification to registered event consumers or servers. This eliminates the problem of receiving duplicate notifications.

The present invention also provides for filtering mechanisms that allow an event consumer to prevent notifications of irrelevant events. When an event occurs, several pieces of information will be available about the event. Filtering can occur on any of these pieces of information. For example, if a create object event is triggered whenever an object is created in the system, an event consumer may submit filtering which further restricts the type of objects that the event consumer is interested in receiving notification of. A user may, for instance, submit filtering information that only allows the user to receive notification when directory objects are created.

The present invention supports a plurality of different filtering options. In one option no filtering is used. Filtering may also be based on the target or event consumer. Such a filtering allows only notification of directed events. Another type of filtering supported by the present invention is location-based filtering. In this filtering mechanism, notification is sent of events meeting a certain location criteria. Another type of filtering supported by the present invention is class-based filtering. In this type of filtering, notification of events affecting a certain class of objects or category of objects is sent. The present invention also supports attribute level filtering. Attribute level filtering sends notification of events affecting designated attributes of objects. Finally, the present invention implements object-based filtering. This level of filtering sends notification of events affecting a certain specific instance of an object or class. Various levels of filtering can be combined in any combination in order to limit the event notifications received to those events affecting any or all of the items of interest.

Filters on any level or type may either be inclusionary or exclusionary. Inclusionary filters send notification when events meeting the specified criteria happen. Exclusionary filters send notification when events occur that do not meet the specified criteria. In other words, exclusionary filters exclude notification of events meeting the specified criteria. Inclusionary and exclusionary filters can be combined in any combination in order to include or exclude certain events.

The present invention also provides a mechanism for allowing a user to create a custom event type. A custom event type is created by placing appropriate entries in the global and local event registries. In addition, an associated process may have to be initiated which receives the custom event and takes appropriate action. For example, if a user wished to initiate automatic running of a virus scan program on multiple user computers in a network, the user would create a launch program event type and register the event type in the global registry. Each of the user computers would then register for the launch program event type using the procedure previously described. One user could then initiate or trigger the run program event. The global event notification process previously described would then notify each of the user computers that the event had occurred. A process running on each of the user computers would then receive the notification and in response run a virus scan program.

Accordingly, it is a primary object of this invention to provide systems and methods for global event notification and distribution.

Another primary object of the present invention is to provide systems and methods for global event notification that allow a local event consumer to receive notification of events without registering with each individual server in the network.

Another object of the present invention is to provide systems and methods for global event notification and distribution that eliminate duplicate event notifications.

A further important object of the present invention is to provide systems and methods for global event notification and distributions that allow a user to register and trigger a custom event type.

Additional objects and advantages will be set forth in the description which follows, and in part will be obvious from the description, or may be learned by practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the present invention are obtained, a more particular description of the invention briefly described above will be rendered by reference to a specific embodiment thereof which is illustrated in the appended drawings. Understanding that these drawings depict only a typical embodiment of the invention and are not therefore considered to be limiting of its scope, the invention will be described and explained with additional specificity and detail through the use of the accompanying drawings in which.

DETAILED DESCRIPTION OF THE PREFERRED EMBODIMENTS

The following description of the present invention is described by using flow diagrams and data flow diagrams to either describe the structure or the processing of one preferred embodiment implementing the systems and methods of the present invention. Using the diagrams in this manner to present the invention should not be construed as limiting of its scope. The present invention contemplates both systems and methods for global event notification and delivery. The presently preferred embodiment of a system for global event notification and distribution comprises a general purpose computer. The present invention, however, can also be used with any special purpose computer or other hardware system and all should be included within its scope.

The preferred general purpose computer comprises traditional computer elements such as display means for displaying information to a user, a CPU means or other processing means for processing program code means, program storage means for storing program code means executed by the CPU or other processing means, and input means for receiving input from a user. Additionally, computers having no local program storage means and that receive program code means across a communication link should also be included within the scope of the present invention.

Embodiments within the scope of the present invention also include articles of manufacture comprising program storage means having encoded therein program code means for causing a CPU to perform certain actions. Such program storage means can be any available media which can be accessed by the processing means of a general purpose or special purpose computer. By way of example, and not limitation, such program storage means can comprise RAM, ROM, EEPROM, CD-ROM or other optical disk storage, magnetic disk storage or other magnetic storage devices, or any other medium which can be used to store the desired program code means and which can be accessed by a general purpose or special purpose computer. Combinations of the above or other program storage means should also be included in the scope of program storage means.

Program code means comprises, for example, executable instructions and data which cause a general purpose computer or special purpose computer to perform a certain function or a group of functions.

Figure 1:
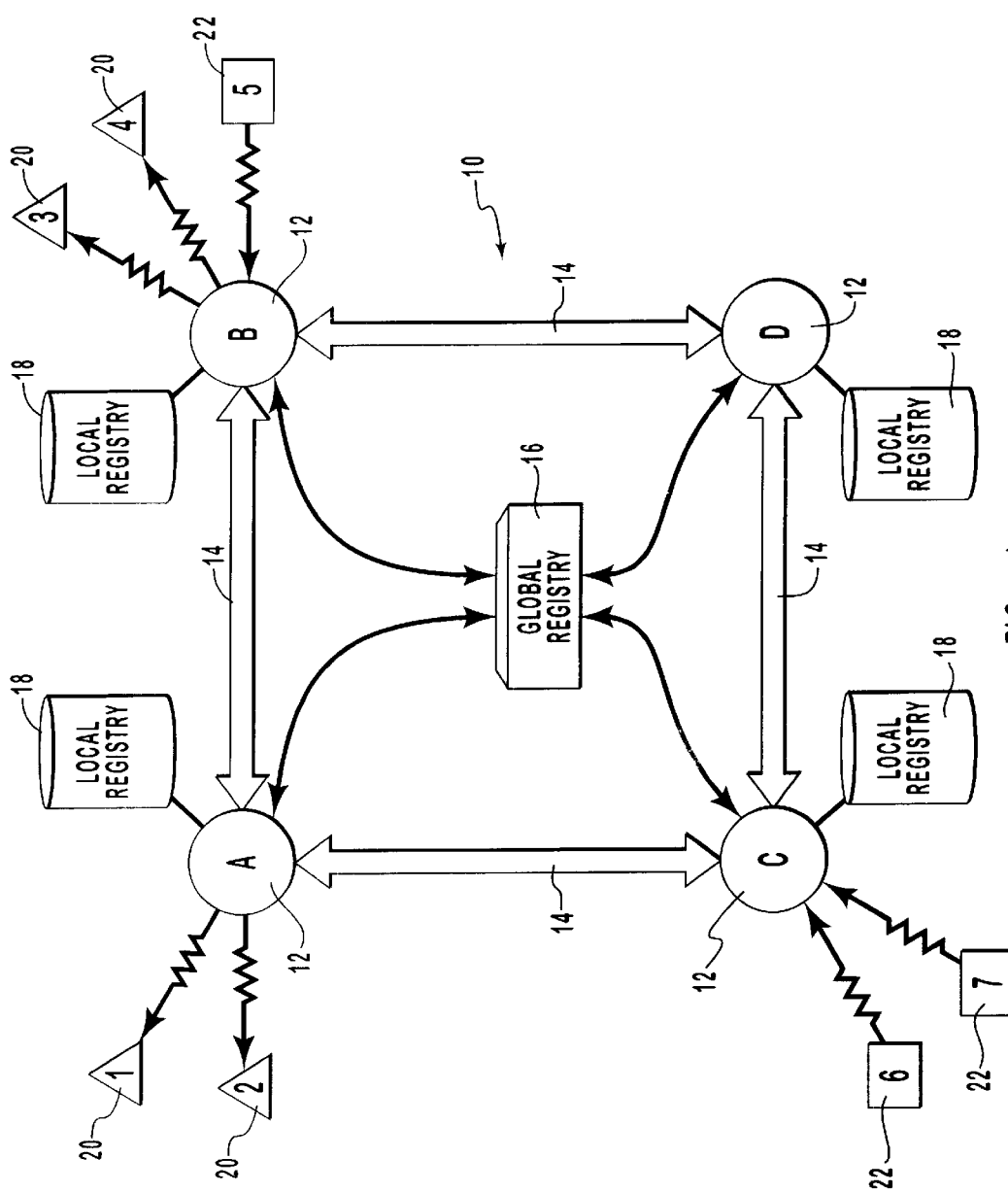
FIG. 1 represents a network view of one embodiment of the present invention.

Referring now to FIG. 1, a network view of one embodiment of the present invention is presented. In FIG. 1, a computer network is shown generally as 10. The computer network comprises a plurality of servers shown as 12 and labeled A–D. Servers in a network are typically interconnected by networking means. Networking means refers to any combination of hardware and/or software used to interconnect servers in a computer network so that messages may flow between the servers. The ability for messages to flow between servers is indicated in FIG. 1 by arrows 14. Any type or kind of network having any type of topology may be utilized for the present invention. All that is required is that messages be able to flow from one server in the network to other servers in the network. One server can access any other server. Thus, network 10 of FIG. 1, may be a LAN network, a WAN network, or any other type or combination of networks. Furthermore, network 10 may be a homogenous network where servers 12 all utilize common networking means or maybe a heterogenous network where servers 12 use a variety of networking means.

The present invention may comprise means for storing a global event registry. In FIG. 1, such means is illustrated by global event registry 16. Global event registry 16 comprises a list of events and a corresponding list of servers that should be notified when an event occurs. Global event registry 16 may be stored in any manner or format that is accessible by servers 12 in network 10. For example, if network 10 is a homogenous network where all servers use Novell Netware™, then global registry 16 can be stored as part of the Netware Network Directory Services (NDS). If, however, network 10 is a heterogenous network then, perhaps, global event registry 16 will be stored as a database file in a format that is accessible by all servers 12. Furthermore, global event registry 16 may be stored as a single registry or may be broken up and distributed among a plurality of servers. All that is required of global event registry 16 is that the information contained therein is accessible by servers 12. As explained below, the information in global event registry 16 may also be cached locally on each server so that each server can gain access to desired information without the need to read from a global file stored somewhere else on the network.

Embodiments within the scope of this invention can comprise means for storing a local event registry. In FIG. 1, such means is illustrated by local event registries 18. As illustrated in FIG. 1, servers 12 each have associated therewith local event registry 18. Local event registry 18 comprises a list of events and a corresponding list of local event consumers. Thus, local event registry 18 allows a particular server 12 to identify which local event consumers need to be notified when a particular event occurs.

A local event registry 18 is shown in FIG. 1 as being associated with each server 12. Typically, local event registry 18 will be stored on local program storage means accessible by a particular server. Thus, server A will store its local event registry on a local disk or other program storage means. Other servers will store their local event registries on their local storage means. Such an arrangement, however, is simply an implementation detail and should not be limiting of the scope of this invention. Other mechanisms may be utilized to store local event registries for each server. For example, local event registries may be stored on a commonly accessible mass storage device. Each server could then access its own local event registry from the common mass storage device.

Although the present invention speaks in terms of a global event registry and a plurality of local event registries, those skilled in the art will recognize that the information contained in the global event registry and local event registry may be stored in a common file or in some other format that achieves the essential functionality described in this invention. For purposes of the present invention, all that is important is that all servers be able to access a list of servers that should receive an event that occurs. Local servers should be able to access a list of local event consumers that should receive an event that occurs. By breaking down this information into two separate lists an advantage is achieved in that the server where the event occurs need not know how to transfer the event to a remote event consumer (an event consumer located at a different server). All a server needs to know is which servers need notification of which events. The individual servers are then responsible for notifying their local event consumers.

In FIG. 1, event consumers are illustrated by the triangular regions 20 and are numbered 1–4. Event producers are identified by rectangular regions 22 and are labeled 5–7. Event producer and event consumer are meant to be generic terms that are interpreted broadly. Event producer will be used to refer to a process, user, device, or other item that produces or generates an event. An event consumer should be broadly interpreted to refer to any process, user, device, or other item that desires notification of an event. As used throughout this application, event notification will refer to not only notification of an event but also distribution of information associated with that event. The details of how event information is distributed in conjunction with notification in one preferred embodiment is described in greater detail below.

Other embodiments of the present invention may also employ specialized features and functionality as described below. In one type of functionality, known as a process-to-process event interaction, a local broker does not need to necessarily reside within a server but may reside as a thin layer within the client system. In such an implementation, the broker process may be operating down within the client portion without residing at the server level. In such an implementation, a local broker may route events between an event producer and event consumer without traversing through a server. In such an architecture, the brokers residing on the client systems, maintain a copy of the global event registry. In such a peer-to-peer, or process-to-process implementation, an event packet comprising an event type and an intended event consumer is generated with the broker checking the registry resident therein to determine the event consumers. The broker thereafter routes the event to the registered event consumer through traditional peer-to-peer communication channels without requesting the specific services of a server for discerning the identities of the specific event consumers.

Another implementation of the present invention partitions the global registry into a distributed architecture. The global event registry may be distributed similar to the NDS of NetWare™ and may break or partition the database into parts that may be stored into several servers or brokers. The partitioning of the global event registry database minimizes the requirement of storage required at a single server entity. The portions of the database not resident within the local server or broker may be referenced when access to those portions are necessary. Furthermore, replication of the partitioned global registry across multiple brokers or servers provides for redundancy, in the event a specific server or broker becomes inactive, other brokers may access the global event registry database by contacting other redundant servers housing the requested portions.

Another function of the present invention also provides for the privatization of a broker by enabling the storage of the global event registry which lists the events and a corresponding list of brokers in order to identify which of the brokers should receive which events. When a specific event producer or consumer attempts to register with a broker, registration criteria enforced by the broker is enforced in order to ensure registration of only those event producers or consumers that are welcomed. When the characteristics of either the event producer or consumer are incompatible with the registration criteria established by the broker, then registration is denied to the event producer or consumer.

An additional feature of the present invention minimizes the amount of updating of the global event registry that must take place. In the present implementation, when an event producer or consumer registers with the local broker, the local broker's cache of the global event registry is updated with the new registration of the event consumer or producer seeking registration. The local server or broker thereafter updates the global event registry with the new registration and issues a new registration event. The new registration event was previously registered in the global event registry with each of the servers having a local cache registered therein as event consumers. When the local broker issues the new registration event, the local broker accesses its own locally cached copy of the global event registry and notes those servers specified as new registration event consumers. The local server or broker thereafter forwards the event to each of the specified server/consumers.

The ability to perform local filtering is yet another function of one embodiment of the present invention. In such an embodiment, the event consumer may specify additional local filtering to be performed on the events to which the local event consumer is specified in the global event registry as an event consumer. Such local filtering provides additional screening of events at the local level without requiring the finer granularity of event selection to be stored in a global event registry.

Another feature of the present invention facilitates the use of a free-form syntax for defining registration criteria. While registration may be set out as a set of defined rules which restrict events by name or event type, class, attribute, location, etc., another embodiment of the present invention facilitates the free-form definition of the registration criteria. In such a method, an event producer or event consumer generates the free-form syntax of the registration criteria and uses such a form when registering with the global event registry. The global event registry thereafter stores the free-form syntax for subsequent comparison of the characteristics of a received event in making a determination if the received event and its associated characteristics match with the free-form syntax specified in the registration definition. When the free-form syntax in the global event registry matches the characteristics of the event, then the broker or server transfers the event to the corresponding event producer or consumer specified in the global event registry. For example, since the present embodiment accepts a registration process using free-form syntax, one example of a free-form implementation may evaluate the characteristics of an event "X" and when the event matches a defined set of criteria such as "X has blue hair, X occurred at 1:47 a.m., etc.".

In one embodiment of the present invention, the broker maintains a single event queue for the buffering of received events. In yet another embodiment, each broker may maintain multiple event queues which may take the form of preferential queues for processing higher priority events. In such an embodiment, event producers may decide to place events in different queues or buffers and have specific event consumers in that queue receive event notification. For example, an executive-only queue may be for applications run by executives that may produce or consume events in such a preferential queue. Such an implementation provides additional privacy and security to specific events. Alternatively, events may be placed and retrieved in buffer configurations other than queues. For example, a stack may be implemented and accessed in a last-in-first-out (LIFO). Such an implementation allows clients to obtain events in reverse order of occurrence. Such an implementation is appropriate in situations where the most recent event must be processed first.

While one embodiment of the present invention employs a static definition of all of the possibilities of event types for inclusion within the global event registry, another embodiment employs a dynamic event type definition structure. In such an embodiment, the quantity of event types that must be stored may be greatly reduced when the number of registrations within the global event registry are few or when the number of event types of the registrations within the global event registry are similar. In such an implementation, the dynamic event type list consists only of the current event types that are presently registered within the global event registry. When a new registration is entered, the global event registry appends the event type to the definition within the global event registry. Therefore, in situations where a registration is removed from the global event registry, and therefore no clients are registered for a particular event type, the broker simply removes the event type from the global event registry.

The present invention may also incorporate additional security into the dynamic event type list. For example, in a traditional embodiment of the present invention, an administrator typically establishes the registrations specifying event producers and event consumers within the global event registry. In one embodiment of the present invention, an event consumer may unilaterally register with the global event registry. Since the event producer, or the event consumer may create the event type, a portion of the traditional security of having such a process performed by an administrator has been bypassed. In the present embodiment, the event producer or the event consumer that created the new event type may provide an authenticating process such as an access control list designating only those other event producers or consumers that may interact with the specified event type. Therefore, the security has moved in such an embodiment from a global type of security into a more process-oriented type of security which may take the form of an access control list, as mentioned above, certificates possessed by those trying to register for the specified event type or other schemes, such as a password scheme. Such an implementation may also be used to encrypt the event data.

The present invention may also employ specific types of events as defined by the system. For example, a "query" event may take the form of an intelligent event that allows event consumers to add information to an event and pass it back from the event consumer to the event producer. For example, a query event may request from the event consumer such information as an acknowledgement or a guarantee that delivery was performed, or any other specific information such as an operating system version number or other data requested by the query event. Furthermore, the broker may also be registered as an event consumer with information specific to the broker to be returned in the response to the query event. In such a configuration, it is possible to actually communicate with the broker who is running this embedded function inside of the event which could perform functions such as designating priority queues or designating servicing of event queues or buffers. When such an embodiment is employed for a guaranteed delivery process, the received acknowledgement or response may specify that the event arrived at a certain broker or alternatively may specify that the event was undeliverable.

Yet another feature of the present invention is the ability to employ filtering enhancements within the concept of the global event system. Filtering enhancements include filtering options and advanced capabilities including dynamic filtering, local filtering, remote filtering and intelligent or dependency-based filtering. Additional filtering may include attribute criteria of the target object. In the case of a network user, for example, the target object of this criteria may be an attribute of the user such as a title, mail stop, last login time, or any detectable attribute of that user. Local filtering, as used herein, includes the ability to filter events at the source where the filter criteria are known, thus preventing further work upon the event. Remote filtering, as used herein, includes the ability to filter events at a destination in addition to the global event system where the filter criteria are not known until the last moment.

Associated with the event itself, additional information may be appended to the event for use in routing, prioritizing, or actually performing tasks upon the event itself. This appended information may be utilized by a server upon receipt of the event in prioritizing the event within a stack or queue. For example, a LIFO or FIFO paradigm may be imposed upon the queue and information associated with the initiation of the event may be utilized to prioritize that event within the queue paradigm. Information may also be associated with the event to prioritize the event over and above the queue paradigm and effectively preempt any other events in the queue. In addition, information associated with the event may be utilized to place the event in one of many queues. For example, one queue may be designated for events generated at an event producer having an executive status. All events having associated information designating an executive status may be preferentially diverted to a specific queue. In the foregoing example, all events in the executive queue may have server priority over any of the other queues.

The information associated with each event may also include information regarding the encryption and compression applications necessary to execute the event or may actually contain executable code which is executed upon comparison with a predetermined criteria on the server. For example, when an executive event producer generates an event, the first server encountering that event would execute the executable code and encrypt the information contained within the event, for example e-mail. The server would identify this associated information and trigger the encryption program for all e-mail messages deriving from an executive workstation. In a similar vein, public key, standard certificate technology, or digital signature technology may be incorporated into the criteria for the server and the information associated with the event to authenticate an event before forwarding or executing the event.

Although some of the examples set forth above incorporate networks utilizing computer workstations and servers, it will be apparent to those skilled in the art that the global event system producers and consumers need not be computer workstations or servers. These consumers and producers may also be other devices such as toasters, watches, televisions, alarm systems, door sensors, automobiles, lights, or any other device located within a home, office or automobile. For example, an automated home may have a central server and a human access computer workstation all tied to several global event producers. Upon unlocking the front door and deactivating the alarm system, an event could be triggered by the deactivation of the alarm which would light the house and increase the temperature within the home. The events generated by these devices could contain instructions which would affect other devices or information associated with the event may be utilized by the server to prioritize the events, or the information associated with the event may contain executable code which then generates further activity within the home.

In addition to the network components set forth above, an additional component that may be utilized is a function registrar. A function registrar contains many executable functions which may be accessed by event producers and consumers. The events may be directly routed to the application registrar or the event may also contain information associated with the event which prompts the server to route the event to the application registrar. For example, the application registrar may contain a spell checking program. Upon completion of a document, an event producer may forward the document in an event to the server which would then forward the event to the application registrar which would execute the spell checking program located on the application registrar. The completed spell checked document would then be forwarded back to the point of origin. Other applications located on the registrar could be anti-virus programs, happy birthday memos, or executable programs which perform complex tasks upon being prompted by an event.

Figure 2:
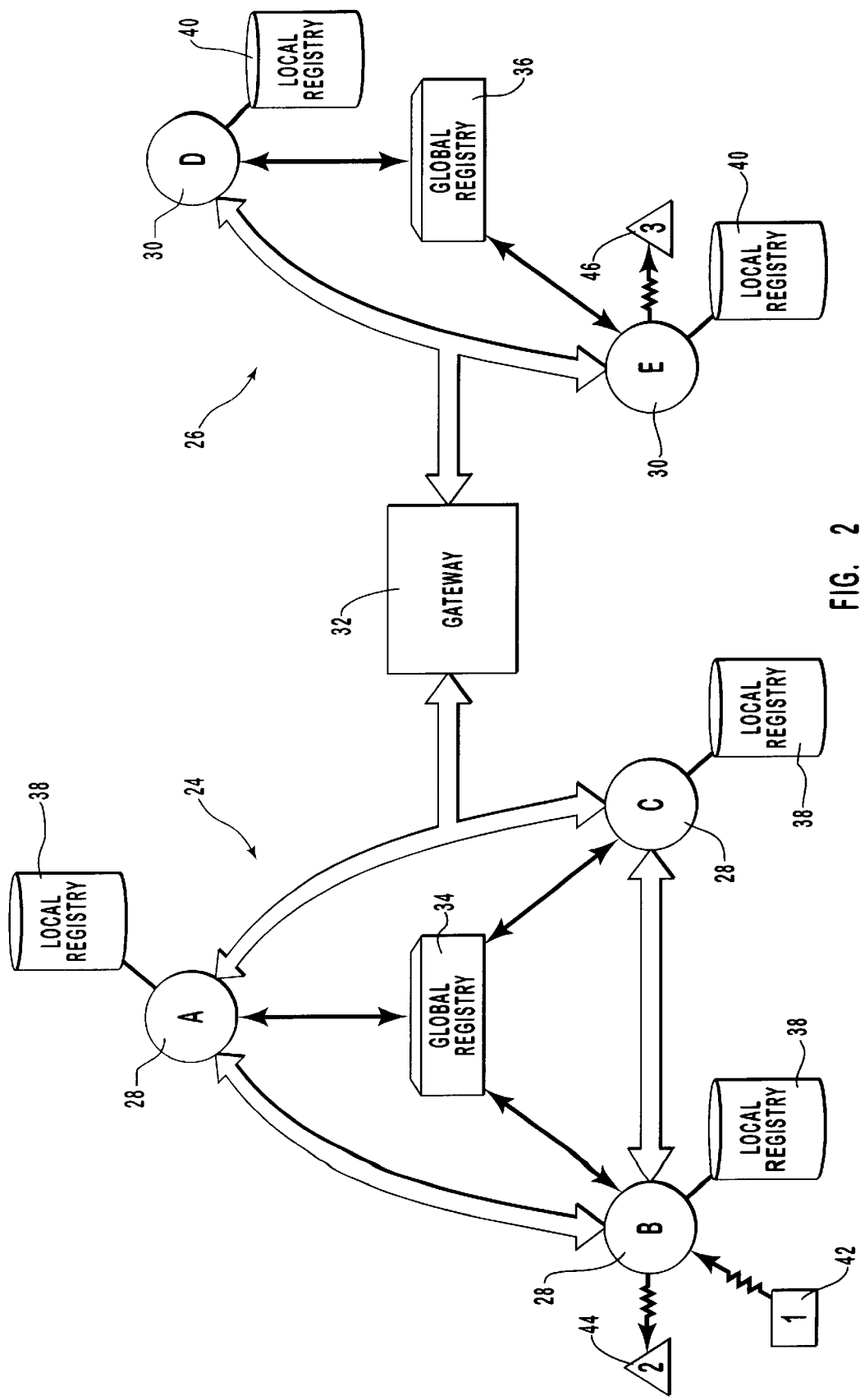
FIG. 2 represents another network view of one embodiment of the present invention.

Referring now to FIG. 2, another network view of one embodiment of the present invention is presented. In FIG. 2, two separate networks are shown generally as 24 and 26. Network 24 comprises servers 28, labeled A, B, and C. Network 26 comprises servers 30, labeled D and E. Networks 24 and 26 are interconnected by gateway 32.

Network 24 can be either a homogenous or heterogenous network and network 26 can also be either a homogenous or heterogenous network. The purpose and function of gateway 32 is to translate message traffic in network 24 to a format that is understood by network 26 and to translate message traffic in network 26 to a format that is understood by network 24. In other words, gateway 32 allows messages from network 24 to flow into network 26 and vice versa so that all servers may communicate.

The inclusion of FIG. 2 is meant to further illustrate the wide variety of networks that can be utilized and supported by the present invention. In place of gateway 32 a long haul connection connecting network 24 and network 26 may also be utilized. Thus, the present invention can utilize and support virtually any type of network.

As illustrated in FIG. 2, network 24 has global event registry 34 and network 26 has global event registry 36. Global event registries 24 and 36 again represent an example of means for storing a global event registry. Previous comments made about global event registry 16 of FIG. 1 fully apply to global event registries 34 and 36 of FIG. 2. In other words, any type or format of data may be utilized as long as global event registries 34 and 36 comprise information allowing the servers which should receive notification of particular events to be identified. In FIG. 2, it is preferred that global event registries 34 and 36 contain identical information. This allows a server from network 24 to transfer events to a server in network 26. In other words, such a situation will allow networks 24 and 26 to be treated as a single common network for purposes of global event notification.

If global event registries 34 and 36 do not contain the same information, the following procedure can be used to accomplish global event notification between network 24 and network 26. If any server in network 24 needs notification of an event that occurs in network 26, an entry can be made on global event registry 36 identifying network 24 as needing notification of an event. Then when the event occurs in network 26, the event can be sent to network 24. When the event arrives in network 24, global event registry 34 can be checked to identify which servers in network 24 need the event. A similar procedure would be used to transfer events from network 24 to network 26. In this manner, global event registry 34 does not need to contain the same information as global event registry 36, but global event notification can still be achieved.

As previously described, embodiments within the scope of this invention can comprise means for storing a local event registry. In FIG. 2, such means is illustrated by local event registries 38 and local event registries 40. As indicated in FIG. 2, servers 28 of network 24 have local event registries 38 and servers 30 of network 26 have local event registries 40. All previous comments regarding local event registries 18 of FIG. 1 fully apply to local event registries 38 and local event registries 40. Local event registries 38 and 40 preferably comprise a list of events and a corresponding list of local event consumers that desire notification of the events. As previously described, local event registries 38 and local event registries 40 can be stored locally to the associated server. As an alternative, they can be stored in any manner, format, or location that allows the appropriate server to retrieve the desired information.

FIG. 2 also illustrates a single event producer 42 and two event consumers 44 and 46. The following example illustrates how an embodiment of the present invention utilizes the global event registry and local event registries to globalize an event. Suppose event producer 42 initiated an event. Further, assume that event consumers 44 and 46 had registered for the event. When server B recognized that event producer 42 had initiated an event, server B would check global event registry 34. Global event registry 34 would identify that server E needed notification of the event. Server B would then send the event through gateway 32 to server E. Server B would then check its local event registry 38 and discover that event consumer 44 needed notification of the event. Server B would then send the event to event consumer 44 using an appropriate transfer method. Server E, after receiving notification of the event from server B, would check its local event registry and discover that event consumer 46 had registered for the event. Server E would then transfer the event to event consumer 46 using an appropriate transfer method.

In the above example, it is easy to see that both local event consumer 44 and remote event consumer 46 receive notification of an event produced by event producer 42 without server B needing to know that event consumer 46 required notification of the event. All server B needed to know is that server E required notification of the event. Furthermore, event notification was transferred from server B to server E without broadcasting the event to servers A, C and D. Thus, such a method can globalize an event to required locations while, simultaneously, reducing message traffic due to broadcast type events.

Another feature of the present invention can be illustrated with reference to FIGS. 1 or 2. The process of registering for an event proceeds as follows. Suppose, in accordance with the previous example, event consumer 46 desired to register for a particular event. Event producer 46 would then register for this event on server E. Server E would then place an entry into its local event registry 40 identifying that event consumer 46 needed notification of the desired event. Server E would also place an entry into global event registry 36 indicating that server E should be notified when the desired event occurred. In the situation shown in FIG. 2 where a second copy of the global event registry exists, namely global event registry 34, the two global event registries may be synchronized. Thus, the contents of global event registry 34 would be updated to include the entry that server E needed notification of the desired event. Now when the event occurs anywhere in the network, the local server will check the global event registry and identify that server E needs notification of the event. The event is then passed to server E which, in turn, checks its local event registry and passes the event along to event consumer 46.

The same procedure can be used with any network, such as the network illustrated in FIG. 1. In the network illustrated in FIG. 1, however, there may be no need to synchronize two copies of the global event registry if global event registry 16 is stored in a single location. In addition, if the servers cache the information in global event registry 16 locally so that they can access the information without accessing the global copy of the global event registry, then a procedure and mechanism must be in place to periodically refresh the cached information and bring it up to date with any changes that have been made in the global event registry. Any type of procedure to refresh the locally cached information may be utilized. For example, a change to the global event registry may generate an event notification to all servers which then go out and refresh their cached information. Alternatively, the servers may periodically poll the global event registry. Any mechanism may be utilized as long as the cached information is updated with sufficient frequency to avoid stale cache data.

From the previous description, it should be apparent that in a preferred embodiment of the present invention each local server has running thereon at least one event globalization process. This event globalization process is responsible for accomplishing the functionality previously described. The following discussion focuses on the processing that occurs on a single server in order to achieve the present invention. In the following discussion, no attempt has been made to differentiate or identify whether the event notification process is a single threaded process or a multi-threaded process. Furthermore, no attempt has been made to identify whether a single process is used or whether multiple processes are used. These details represent designed decisions that may depend on the particular server and/or network implementation. In the following discussion, rather, emphasis is placed on functions to implement one embodiment of the present invention.

Figure 3:
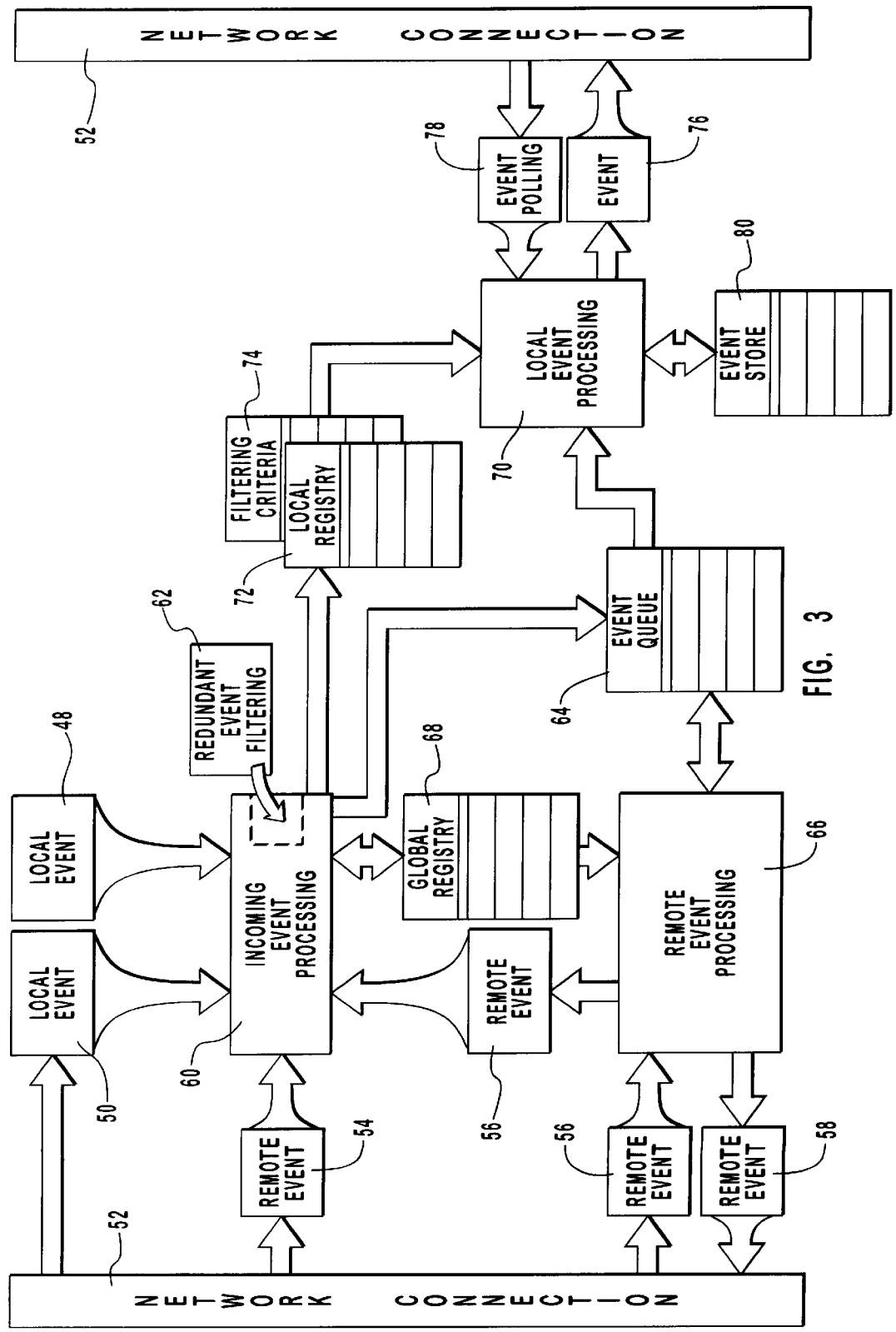
FIG. 3 is a data flow diagram of one embodiment of an event globalization process of the present invention located on a single server.

Referring now to FIG. 3, a structural data flow diagram is presented for one embodiment of the event globalization process of the present invention. A global event notification process such as that of the present invention deals with two general classes of events. The first are local events that are generated locally. The other category is remote events which are events that occur on another server, but are sent to the local server via the mechanisms described previously. In FIG. 3, local and remote events are labeled appropriately. For example, local event 48 represents a local event generated by the local server itself or by a process running on the local server. Local event 50 represents a local event received from a user, client computer or other device connected to the local server via network connection 52. Remote events 54 and 56 represent events received from other servers. Remote event 58 represents a local event that is transferred to another server via network connection 52. It should be pointed out that in FIG. 3 network connection 52 represents an example of the networking means for interconnect servers in the present invention.

In FIG. 3, the illustrated events, whether they be local events or remote events, are preferably packaged into an event packet. From an implementation standpoint, it does not matter where such a packaging takes place. Packaging may take place in the event producer that produced the event, packaging may take place in the event globalization process of the present invention, or packaging may take place in a combination of locations such as a partial packaging by the event producer and a more complete packaging by the event globalization process of the present invention. In fact, this last option is probably the most likely since the format of the event coming from an event producer will depend solely upon the underlying event system.

For most events, packaging event data into an event packet has the benefit of adding data that may be useful in processing the event. In one embodiment, an event packet comprises:

| Event Producer | Server | Type of Event | Time of Event | Size of Event Data | Event Data |
|---|---|---|---|---|---|

In the above event packet, the event producer field is an identifier that identifies the process, device, user, etc., which generated the event. The server field identifies the server location where the event was produced. The type of event field is an identifier describing the type of event which occurred. This identifier preferably identifies an event in the global event registry and/or local event registry so that appropriate servers or event consumers can be identified to receive the event. The time of event field is a time stamp indicating the time that the event occurred. This time stamp is preferably a network time that can be referenced by each server in the network, although this is not strictly required. The size of event data is a field indicating the size of the attached event data field. The event data is the data associated with the event.

Although the above describes a presently preferred event packet, it should be understood that for this invention the only required field is the type of event field. The type of event field is used to extract from the global event registry, either directly or indirectly, those servers that should receive notification of the event and is used to extract from the local event registry, either directly or indirectly, those local event consumers that should receive notification of the event. In addition to the type of event field, the event data should also be included so that the event information can be transferred to the appropriate recipients.

Embodiments within the scope of this invention comprise means for receiving an event from either a local event consumer or another server. In FIG. 3, such means is illustrated by incoming event processing block 60. Although the details of incoming event processing block 60 are presented below, functionally incoming event processing block 60 is responsible for examining incoming local or remote events and ensuring they are handled properly. Incoming event processing block may thus comprise means for creating new event types and/or means for registering for an event. In such a case, incoming event processing block 60 will ensure the proper entries get made into the global event registry and/or local event registry when an event consumer wishes to create a new event type or register for an existing event type. When registering for an event, if filtering criteria is submitted, incoming event processing block 60 will ensure the filtering criteria is stored appropriately. Incoming event processing block 60 is also responsible for placing incoming events into event queue 64. Event queue 64 is used to store received events until they can be dispatched either to local event consumers or to other servers in the network.

Embodiments within the scope of this invention may also comprise means for removing events that occur on a server because they were triggered by a similar event on another server. In other words, embodiments within the scope of this invention may comprise means for removing events which will result in duplicate notifications to a single event consumer. In FIG. 3, the means for removing events is illustrated by redundant event filtering block 62. Although the details of how redundant events are filtered is presented below, essentially redundant event filtering block 62 removes duplicate events so registered event consumers will not receive duplicate notifications of a single event. Redundant event filtering block 62 may be implemented as a separate processing block or may be part of incoming event processing block 60 as illustrated in FIG. 3 or may be part of another processing block.

Embodiments within the scope of this invention comprise means for transferring an event to another server. In FIG. 3, such means is illustrated by remote event processing block 66. The details of remote event processing block 66 are presented below. In summary, however, remote event processing block 66 monitors event queue 64 and when events are placed therein by incoming event processing block 60 that need to be transferred to other servers in the network, remote event processing block 66 will establish a connection to those servers and transfer the events to the other server. Embodiments within the scope of the present invention may, therefore, comprise means for accessing a global event registry to identify which servers should receive which events. Such means may be incorporated into remote event processing block 60. In such a case, remote event processing block 66 identifies the servers that should receive events queued in event queue 64 by checking global registry 68.

As described in greater detail below, when an event is transferred from one server to another server, a connection must be established between the two servers. Once the transfer is complete, then the connection is terminated. Since it takes time to establish and terminate a connection, it is preferable that when a connection is established between two servers, all information that needs to be transferred between the two servers be accomplished while the connection is established. Thus, there is a possibility of events being transferred both to and from the local server. This is indicated in FIG. 3 by remote event 56 and remote event 58. Notice that an incoming event, illustrated by remote event 56, is passed to incoming event processing block 60.

Embodiments within the scope of this invention also comprise means for transferring an event to a local event consumer using a designated method. In FIG. 3, such means is illustrated by local event processing block 70. The details of local event processing block 70 are presented below. Briefly summarized, however, local event processing block 70 monitors event queue 64 for events that should be transferred to a local event consumer. Embodiments of the present invention may, therefore, comprise means for accessing a local event registry to identify which local event consumers should receive which events. Such means may be incorporated into local event processing block 70. In such a case, local event consumers that should receive events queued in event queue 64 are identified by checking local event registry 72 and any associated filtering criteria. Embodiments within the scope of the present invention may comprise means for filtering events so that an event is only transferred when the event meets designated filtering criteria. Such means, discussed in greater detail below, may be part of local event processing block 70. The filtering criteria is illustrated in FIG. 3 by filtering criteria block 74. Although the details of filtering are presented below, filtering criteria may be stored as part of the local event registry or may be stored in any other manner as long as a local server can access the filtering criteria and identify the local event consumer and the event type that the filtering criteria applies to.

In FIG. 3, the process of transferring an event to a local event consumer is illustrated by event 76. Event 76 is shown going out over network connection 52. However, if the event consumer is a local process, event 76 may be transferred to the local event consumer by placing it in a common memory store, storing it on a file on the disk, or any number of other means that allow two processes running on the same computer to communicate data back and forth. If, however, an event is transferred to an event consumer over network connection 52, then any number of other transfer methods may be utilized. For example, the event consumer may poll local event processing block 70. This is illustrated in FIG. 3 by event polling notification 78. Furthermore, events may be stored in an event store such as event store 80 until they are transferred to an event consumer. The transfer options between local event processing block 70 and an event consumer over network connection 52 are discussed in greater detail below.

Figure 4:
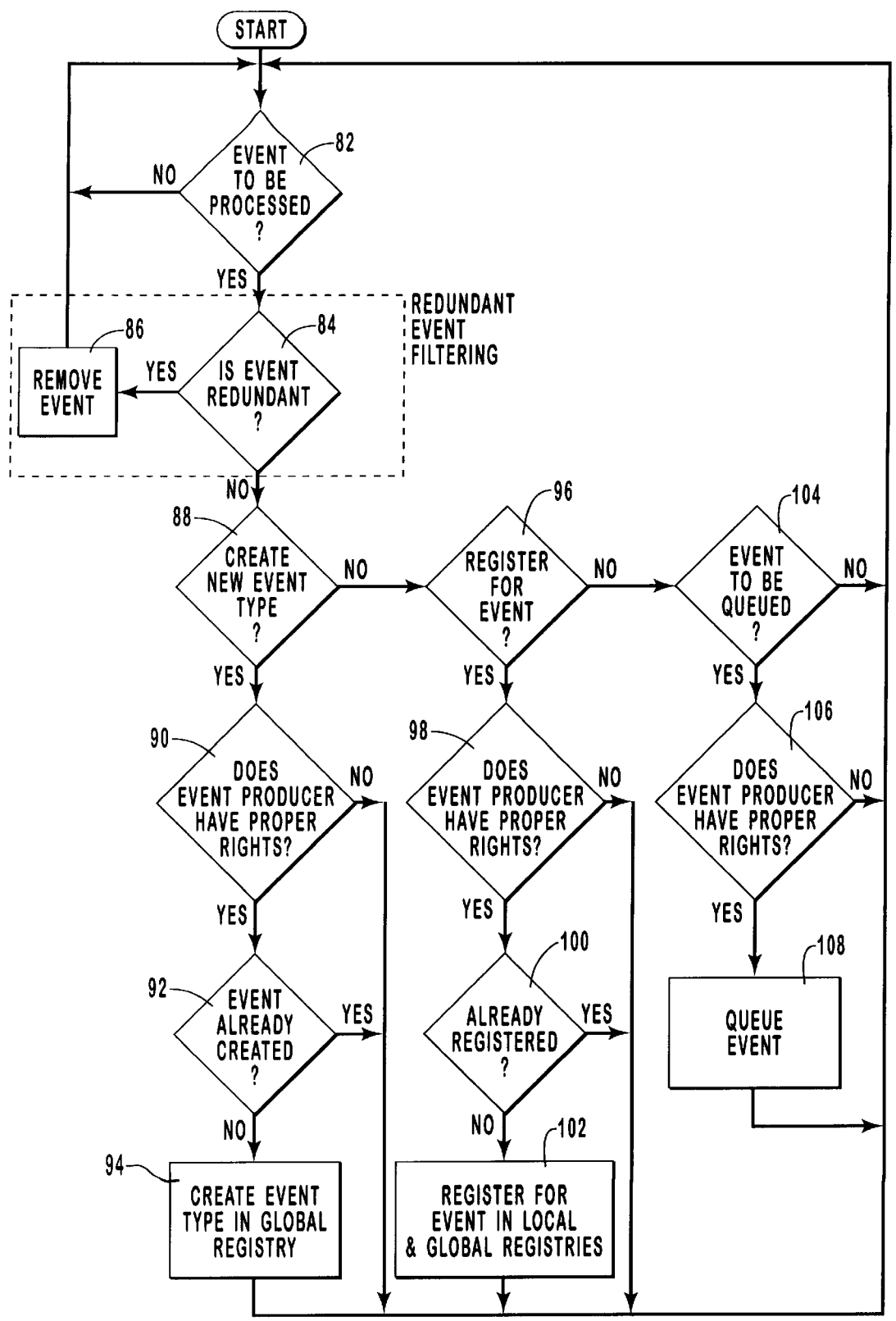
FIG. 4 is a flow diagram illustrating the details of one embodiment of the incoming event processing block of FIG. 3.

Turning now to FIG. 4, the details of one embodiment of incoming event processing block 60 are presented. As previously described, incoming event processing block 60 waits until an event arrives to be processed. The types of events which can be handled by incoming event processing block 60 are typically divided into three types: (1) local events originating on the local server (illustrated by local event 48 of FIG. 3); (2) local events arriving from an attached event producer (illustrated by local event 50 of FIG. 3); or (3) remote events arriving from another server (illustrated by remote event 54 and 56 of FIG. 3).

Until an event arrives to be processed incoming event processing block 60 performs no action. This is illustrated in FIG. 4 by decision block 82. When an event arrives to be processed, if the redundant event filtering function is incorporated into incoming event processing block 60, as illustrated in FIG. 3, then the next step is to identify whether the event is redundant. This is illustrated in FIG. 4 by decision block 84. Notice that decision block 84 is enclosed within a dashed box labeled "redundant event filtering." If the redundant filtering function is placed elsewhere, then the steps inside the dashed block may be eliminated.

In order to identify redundant events, events may have associated therewith identifying means for distinguishing between events that occur because they were triggered by a similar event on another server and events that occur but were not triggered by a similar event on another server. Embodiments of the present invention may also comprise means for associating such identifying means with each event that occurs on said local server. The means for associating such identifying means may be the underlying event notification system or it may be the event producer. Such issues represent implementation details The phrase "triggered by a similar event on another server" is meant to identify those scenarios where duplicate event notification could be sent to an event consumer if the event notification is sent.

As an example of the above, consider a network with three servers: server A, server B and server C. A global database is broken up into three separate parts: part I, part II and part III, and distributed among servers A, B and C. Server A has database parts I and II, server B has parts II and III, and server C has parts III and I. If an event consumer registers for notification when the database changes, then when part I of the database changes on server A, server A will send information to server C so that server C can also update part I of the database. This is necessary to ensure that the two copies of part I contain the same data.

In order to distinguish between the original modification that occurs on server A and the modification that occurs on server C, identifying means can be associated with the event. The identifying means associated with the event on server A can identify the modification event as an original modification event. The identifying means associated with the event that occurs on server C can identify the event as a triggered or duplicate event. Decision block 84 can then use the identifying means to determine whether an event originally occurred on the local server or whether the event originally occurred somewhere else and the event that occurred on the local server was a duplicate of the original event.

If the event is a duplicate event, then the event is removed or ignored so that notification of the event is never sent. This is illustrated in FIG. 4 by step 86. As explained in greater detail below, step 86 may be nothing more than ignoring or marking the event without sending notification to other servers. Care must be taken in removing an event from an event queue, such as event queue 64 of FIG. 3. This is because the same event may also need to be sent to local event consumers. If an event is removed from an event queue, such as event queue 64 of FIG. 3, before notification can be sent to the local event consumers by local event processing block 70 of FIG. 3, then the local event consumers will never receive notification of the event. Thus, in order to avoid this situation, step 86 may simply ignore the entry or may flag the entry so that it is not checked again by this process. On the other hand, since this event represents a duplicate event, it is unlikely that notification of this duplicate event will need to be sent to local event consumers. Thus, in some embodiments, step 86 may safely remove the duplicate event from the event queue, such as event queue 64 of FIG. 3.

If the event is not a redundant event, then a decision must be made as to what the event represents and how the event may be handled. The event globalization process running on each individual server typically does not handle many events. As previously described, however, embodiments of the present invention may comprise means for creating new events and/or means for registering for an event. If such means is incorporated into incoming event processing block 60 of FIG. 3, then the event globalization process will handle requests to register an event consumer for an event or to create a new event. When an event consumer needs to register for a new event or create a new event, the event consumer can send a "register for event" packet or a "create event packet" to the event globalization process on the local server. When an event is created, the event globalization process will create an entry in the global event registry, as for example global event registry 68 of FIG. 3. This entry will include the event identifier of the new event. When an event consumer registers for an event, the event globalization process will place an entry in the local event registry, as for example local event registry 72 of FIG. 3, identifying the event and the event consumer wishing to receive notification of the event. The event globalization process will also place an entry into the global event registry, as for example global event registry 68 of FIG. 3, identifying the local server needing to receive notification of the event when it occurs. These functions are described in the remainder of FIG. 4.

Decision block 88 of FIG. 4 ascertains whether the incoming event directs the event globalization process to create a new event type. If so, then the next step is to check whether the event producer has the appropriate rights to create a new event type. This is illustrated in FIG. 4 by decision block 90.

As indicated by decision block 90, 98, and 106 of FIG. 4, the present invention may comprise various means to check whether an event producer has appropriate rights for the requested action. The type of rights which may be required are: (1) rights to create a new event; (2) rights to register for a particular event; and (3) rights to trigger or send an event to the system. Decision block 90 represents a check as to whether the event producer has appropriate rights to create an event type. The other rights are discussed in greater detail below. It should be noted that embodiments within the scope of this invention may comprise some, all, or none of these security rights checks.

If the event producer does not have the proper rights, execution returns to the start. If the event producer does have the proper rights to create an event, then the next step is to check and see if the event is already created. This is illustrated in FIG. 4 by decision block 92. If the event has already been created in the global event registry, it does not make sense to add another entry to the global event registry. Processing then proceeds to the start. If, however, the event has not already been created, then an entry is made into the global event registry, as for example global event registry 68 of FIG. 3, to identify that a new event type is available. Such an entry comprises the event type identifier. The creation of this entry is illustrated in FIG. 4 by step 94. Step 94 represents one example of means for creating new events.

Returning to decision block 88, if the event is not creating a new event type, the next step is to check to see if the received event is registering an event consumer for an existing event. This check is performed in FIG. 4 by decision block 96. If the event is registering a local event consumer for a particular event, then execution proceeds to decision block 98 which determines whether the event producer (the local event consumer that is attempting to register for this event) has the appropriate rights to register for this event. If the event producer does not have the appropriate rights, then execution returns to the start.

If the event producer (i.e., the local event consumer that is attempting to register for the event) has the appropriate rights, then the next step is to check and see if the event consumer has already registered for this event. This is performed by decision block 100. If the consumer is already registered for the designated event, execution returns to the start. If the event consumer has not already registered for the event, then entries are made into the local and global event registries in order to achieve registration for this event by the event consumer. This is illustrated in FIG. 4 by step 102. Step 102 represents one example of means for registering for an event.

As previously described, the process of registering for an event comprises making one entry identifying the event type and the local event consumer wishing to receive notification of the event and another entry identifying the server attached to the local event consumer as needing notification of the event type. In a preferred embodiment, the entry identifying the server as needing notification of the event is made in the global event registry, as for example global event registry 68 of FIG. 3, and the entry identifying the local consumer as needing notification is made in the local event registry, as for example local event registry 72 of FIG. 3. As previously described, however, such a mechanism does not need to be stored in this exact format. The global and local registries may be combined into a single registry as long as the appropriate information can be accessed by the appropriate servers.

In addition to making entries into the global and local event registries, registering for an event may also comprise the step of associating filtering criteria with an event consumer. If an event consumer is submitting filtering criteria, step 102 should also store the filtering criteria in the appropriate location. As previously described, the present invention supports of multiple levels of filtering. The filtering criteria is utilized in conjunction with the local event processing block in order to restrict notification to events meeting certain criteria. The details of filtering are discussed in conjunction with FIG. 6 below.

Returning to decision block 96, if the received event is not registering an event consumer for an event, execution proceeds with decision block 104. As previously indicated, decision block 104 checks whether this event is to be queued. Typically, events received by incoming event processing block 60 of FIG. 3 fall into one of three categories. The first category is an event creating a new event type. This event is handled as previously described. The second category is an event registering a local event consumer for an event type. This is also handled as previously described above. All other events received are typically destined for either one or more local event consumers or one or more other servers so that they may in turn be passed to their event consumers. Thus, in practice, it may not be necessary to have decision block 104 as illustrated in FIG. 4. If an event fails decision block 88 and decision block 96, then the only other option typically available is to queue the event. In such a situation, decision block 104 may be eliminated.

Assuming the received event is to be queued, the first step is to test whether the event producer has the appropriate rights to queue the event. This is checked in decision block 106. If the event producer has the appropriate rights then the event is placed in the event queue as indicated by step 108. The event queue is illustrated in FIG. 3 by event queue 64. As described below, remote event processing block 66 and local event processing block 70 check event queue 64 for events that need to be transferred to either local event consumers or other servers in the network.

Figure 5:
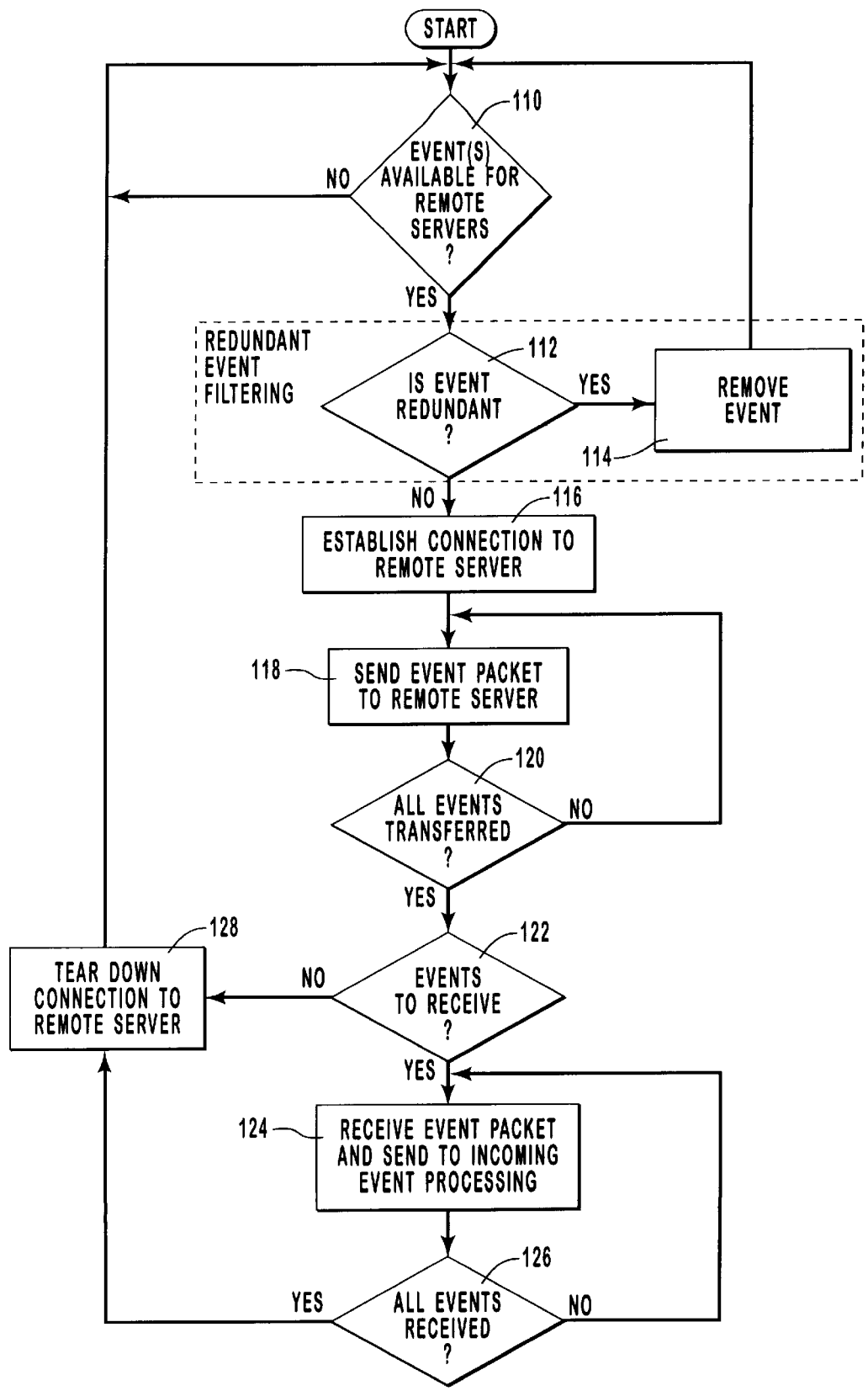
FIG. 5 is a flow diagram illustrating the details of one embodiment of the remote event processing block of FIG. 3.

Referring next to FIG. 5, the details of remote event processing block 66 are presented. As indicated in FIG. 5, the first step is to check the event queue for events that should be transferred to other servers in the network. This step is indicated in FIG. 5 by decision block 110. Decision block 110 checks for events that should be sent to other servers in the network by looking at the event types queued in the event queue, as for example event queue 64 of FIG. 3, and compares them to the entries in the global event registry, as for example global event registry 68 of FIG. 3. Decision block 110 can thus represent one example of means for accessing a global event registry to identify which servers should receive which events. As previously described, the entries in the global event registry identify servers that should be notified when particular events occur.

One important aspect of decision block 110 should be mentioned. Decision block 110 only sends locally occurring events (e.g. events not received from other servers) to other servers. The reason for this is simple. If remote event processing block 66 sent both locally occurring events and events received from other servers, the event notifications would propagate endlessly in the network resulting in an endless number of duplicate notifications.

If there are no events that need to be transferred to other servers in the network, the process waits until an event occurs that should be transferred to other servers in the network. If, on the other hand, events exist which should be transferred to other servers in the network, then execution proceeds with the yes branch of decision block 110.

As previously described in conjunction with FIGS. 3 and 4, the means for filtering redundant events can be incorporated into incoming event processing block 60. Rather than incorporate the means into incoming event processing block 60, however, such means may also be incorporated into remote event processing block 66 of FIG. 3. If it is desired to incorporate this functionality into remote event processing block 66, then the steps enclosed in the dashed line indicated in FIG. 5 should be included. These steps are identical to the steps enclosed in the dashed line in FIG. 4. Decision block 112 checks whether the event is redundant. This check is performed as previously described in conjunction with decision block 84 of FIG. 4. If the event is redundant, then the event is removed without notification by step 114.

Recall that the event queue, such as event queue 64 of FIG. 3, holds events for both remote event processing block 66 and locally net processing block 70. If, therefore, the logic to remove duplicate events is inserted into remote event processing block 66 rather than incoming event processing block 60, then care must be taken to also insert the same logic into local event processing block 70. If the redundant event filtering logic is placed only in remote event processing block 66 and not local event processing block 70, then a situation can arise where duplicate event notifications will be sent to local event consumers but not remote servers.

If the event is not redundant, or if redundant event filtering is not incorporated into remote event processing block 66, then the next step is to establish a connection to the remote server. This is illustrated in FIG. 5 by step 116. The details of how a connection is established to another server in the network will be dependent upon the type of networking system used to connect servers in the network. If the network is heterogenous where different servers use different networking means, it may be desirable to utilize a common format in order to establish connection to the remote server. All that is necessary is the ability to establish a connection from the local server to the remote server in a manner that allows the two event globalization processes on each to communicate.

After the connection to the remote server is established, all events in the event queue destined for that server, such as event queue 64 of FIG. 3, are transferred to the remote server. This is illustrated in FIG. 5 by step 118 and decision block 120. As previously mentioned, because it takes time to establish and terminate the connection between two servers, it is preferable that all messages be transferred at the time a connection is established.

In accordance with this philosophy of transferring all messages at the time a connection is established, it is desirable to receive from the remote server any events which the remote server has for the local server while the connection is established. The existence of such events is tested in FIG. 5 by decision block 122. At the remote server, the remote server can identify whether events are available for the local server by checking its event queue against the information in the global event registry, similar to the process described in conjunction with decision block 110 above.

If the remote server has events to transfer to the local server, then all such events are received and transferred to incoming event processing block 60 of FIG. 3 for appropriate action. This process is illustrated in FIG. 5 by step 124 and decision block 126. If there are no events to receive from the remote server, or if all events have been received from the remote server, the connection is terminated as illustrated in step 128.

It will be understood by those of skill in the art that steps 116, 118, 120,122, 124, 126 and 128 need to be performed for each server that needs notification of the event in the event queue. Furthermore, after an event has been sent to the appropriate servers in the network, the event should not be removed from event queue 64 unless and until the event has also been transferred to any local event consumers desiring notification of the event. It may, therefore, be advantageous to associate with each event in the event queue a flag indicating that it has been sent to the appropriate servers in the network and another flag which identifies if the event has been sent to the appropriate local event consumers. After an event has been sent both to the appropriate servers in the network and to the appropriate local event consumers, then the event can be removed from the event queue. In the alternative, separate event queues can be kept one for remote event processing block 66 and one for local event processing block 70. In this way, events needing to be transferred to remote servers can be placed in a remote event queue and events needing to be transferred to local event consumers can be placed in a local event queue. Events that need to be sent to both, can be placed in both queues. In such a scheme, after an event has been transferred then it could be deleted out of the appropriate queue.

The above discussion of FIG. 5 has focused on how one embodiment of remote event processing block 66 of FIG. 3 identifies remote events that need to be transferred from event queue 64 to a remote server in the network. It is understood, however, that the server in the network which receives the transferred remote events must provide a mechanism for receiving the transferred events. Those skilled in the art will understand the functionality required to receive the transmitted events. Essentially, the remote server must be able to recognize that a connection is being established by the local server, receive the events which are transferred to the remote server, and then be able to check its event queue to determine whether any events exist at the remote server which should be transferred to the local server while the connection is established.

Figure 6:
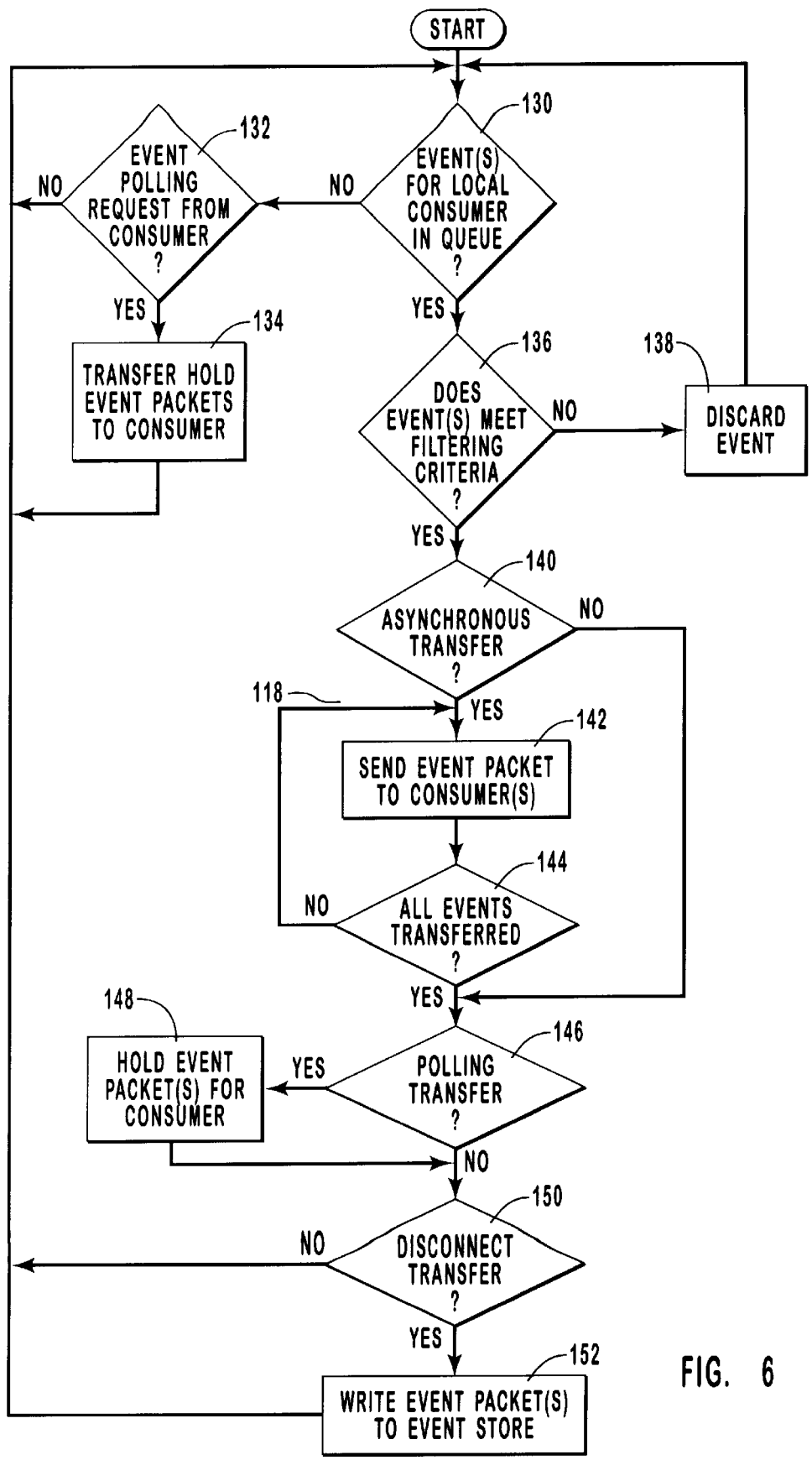
FIG. 6 is a flow diagram illustrating the details of one embodiment of the local event processing block of FIG. 3.

Referring next to FIG. 6, one implementation of event processing block 70 of FIG. 3 is presented. As previously summarized, local event processing block 70 checks event queue 64 and transfers any appropriate events in the queue to the appropriate local event consumers. FIG. 6 illustrates one embodiment that performs this function. As previously discussed, if duplicate events are not removed by incoming event processing block 60 of FIG. 3, it may be necessary to place the steps to remove duplicate events into local event processing block 70. This will consist of performing steps 84 and 86 of FIG. 4. For the following discussion, however, these steps are not included in FIG. 6.

As indicated by decision block 130 of FIG. 6 the first step is to identify whether events in the event queue, such as event queue 64 of FIG. 3, need to be transferred to local event consumers. This can be accomplished by comparing the event type information of the events in the event queue with the information stored in the local event registry, such as local event registry 72 of FIG. 3. Decision block 130 can thus represent one example of means for accessing a local event registry to identify which local event consumers should receive which events. If there are no events for local event consumers in the queue, local event processing block 70 may also check whether an event polling request has been received from a local event consumer. This is represented in FIG. 6 by decision block 132.

As described in greater detail below, local event processing block 70 may utilize a variety of mechanisms to transfer events to local event consumers. One mechanism that may be used to transfer events to a local event consumer is a polling method. For some event consumers, it may be more convenient and efficient to establish a polling routine between local event processing block 70 and the local event consumer. In such a scheme, events for the local event consumer will be held until the local event consumer requests them. Once a request is received, then the events which have been held are transferred to the local event consumer. This transfer is indicated in FIG. 6 by step 134. Further details about other mechanisms used to transfer events to a local event consumer are presented below.

As previously mentioned, embodiments of the present invention may comprise means for filtering events so that an event is only transferred if the event meets designated filtering criteria. Returning to decision block 130, if an event is available for transfer to a local event consumer, the next step is to identify whether the local event meets any stored filtering criteria for that event and local event consumer. This is illustrated in FIG. 6 by decision block 136, which represents but one example of the means for filtering. As previously discussed, event consumers may submit filtering criteria for registered events. Such filtering criteria may be stored with the local registry or in any other manner that allows the desired information to be retrieved by a server in order to identify whether specific events meet the filtering criteria. Filtering criteria can be associated with a particular event and a particular event consumer. Furthermore, filtering can be performed on any of the information available from a particular event. The available information for an event includes not only the information available in the event data itself, but also in the event packet, such as the event packet previously described.

In one embodiment, filtering takes place on any or all of the following. One level of filtering can be event consumer filtering. The present invention has the ability to support directed events. Directed events are events that are directed to a specific event consumer or a group of specific event consumers, to the exclusion of other event consumers even though all event consumers are registered for the same event types. For example, consider a "chat" event. A chat event can be used to support a chat session between two users on the network. In a chat session one user types information on the screen and the information is transferred to another user. The other user can then reply by typing text on the screen, which is transferred to the first user. Obviously the utility of such a chat session is greatly enhanced by being able to direct the chat session to a specific user or to a specific group of users. Directed events are ideal to support such a chat session.

When user 1 had finished typing text and was ready to transmit the text to user 2, user 1 would create a chat event where the event data comprises the user or group of users to receive the data and the actual text data itself. The event globalization process running on the local server would recognize the event and propagate the event to the other servers that had registered for the chat event. The other servers then examine the data in order to identify whether user 2 was connected to the server. If a server finds user 2 connected to it, then the server transfers to the chat event to user 2. User 2 then displays the data on the screen. A reply from user 2 to user 1 is handled in the same way. Thus, directed events can be implemented using a form of filtering criteria where the filtering is the identity of the event consumer. If a server has an event consumer where the identity matches the directed event's intended consumer, then the event can be transferred to the identified event consumer.

Another level of filtering that can be supported by the present invention is location based filtering. In location based filtering, an event consumer would submit a filter containing an area of the network of interest to the event consumer. For example, suppose in a network containing many servers scattered across many different geographically remote sites, a user was interested only in obtaining information about events at the local site. The user could then submit a filter identifying the servers in the local site. Events which matched the local site criteria would then be passed on to the user. Events which came from other sites, would be filtered out without notification.

Another type of filtering that may be supported by the present invention is a class based or category based filtering. A class based or category based filter identifies classes or categories of objects that are of interest to an event consumer. For example, consider an employee phone book database maintained on the network. It would be desirable to update the employee phone book database whenever a new employee was added to the system or whenever information about an existing employee was changed. In such a situation, the employee phone book database could register for notification of "a modified object" type event. The employee database could then submit a filter that filtered out modifications to any objects except employee record type objects. Then when an employee record was changed in the system, the database would receive notification that an employee record had been changed.

Another level of filtering that may be supported by the present invention is attribute level filtering. Attribute level filtering identifies attributes of particular classes of objects that are of interest to an event consumer. For example, returning to the employee phone book database example given above, the employee phone book database only cares when the phone number of an employee information record is changed. For example, if an employee's address changes, the employee phone book database would not care. If, however, an employee's phone number changes, then the employee phone book database would like to be notified of that event. Thus, the employee phone book database could submit a filter identifying the phone number attribute as important to it. Then when an employee record was changed, the employee phone book database would only receive notification if the employee phone number attribute of that employee record was changed.

A further level of filtering that may be supported by the present invention is instance based filtering. Instance based filtering identifies a particular instance of a particular object that is of interest to the event consumer. For example, suppose a database was maintaining information about a particular employee. The database would then want to identify any changes that were made to a particular employee record on the system. In such a case, an event consumer could submit a filter identifying that particular employee record as of interest to it. Then when an event occurred which modified that particular employee record, the event consumer would be notified of the event.

The above discussion of the various filtering criteria have been presented in the context of inclusionary filters. Inclusionary filters are filters that allow notification of events meeting certain criteria. Any of the above filters may also be exclusionary in nature. Exclusionary filters exclude notification of filters that meet certain criteria. In other words, notification is sent unless an event meets the designated criteria. If the event meets the criteria, then the event is filtered out and notification is not sent.

The above levels and types of filtering may be used in any combination. Thus, various inclusionary and exclusionary filter may be combined on any or all levels. Furthermore, the above levels and types of filtering may be used in such a way that to meet the filtering criteria an event has to pass all of the submitted filters or the filtering criteria can be combined in such a way that an event meeting any one of the various filtering criteria submitted would suffice. In other words, the filtering criteria may be used in the alternative or altogether.

Although the above discussion on filtering and filtering criteria has focused on certain specific types of filtering, any attributes or information, either in the event data or in the event packet, can be used for filtering. For example, the event packet described above has an event time field. A filter could be submitted that filtered events according to a particular event time criteria.

Returning now to FIG. 6, step 138 indicates that if the filtering criteria is not met, then the event is discarded. An event cannot be removed from the event queue until it is both sent to all local consumers who desire notification and all other servers which desire notification. Thus, step 138 may simply indicate that the event is not transferred to the identified local event consumer. It may also be desirable to mark the event in some manner so that the event is not reprocessed by local event processing block 70. If the event has been transferred to all appropriate local event consumers and all remote servers, then the event can be removed from the event queue.

Once an event meets the filtering criteria, the next step is to transfer the event to the appropriate event consumer using an appropriate transfer method. The remainder of FIG. 6 presents three separate transfer methods. An asynchronous transfer method, a polling transfer method, and a disconnect transfer method. Presenting these three transfer options should not be construed as limiting of the scope of this invention. Any appropriate transfer method used to transfer the event to the designated local event consumers can be utilized. The asynchronous transfer method, the polling transfer method, and the disconnect transfer method are particularly well suited to transferring events to event consumers attached to the local server. If event consumers are processes running on the local server, then other transfer methods may be more appropriate. Such transfer methods can include any type of transfer method used to communicate data between processes running on the same machine. For example, perhaps event notification could occur by placing the event in a shared memory location. As another example, event notification may be accomplished by sending a message to the event consumer process. As yet another example, the event may be transferred by writing the event to a data store which could then be read by the local event consumer. Any other method of transferring the event to the event consumer may also be utilized.

Returning now to FIG. 6, decision block 140 tests whether the transfer to the event consumer should be an asynchronous transfer. An asynchronous transfer is a transfer where the event consumer is notified that an event is available for transfer and the event is transferred to the event consumer using an appropriate transfer protocol. If the event is to be transferred using an asynchronous transfer method, step 142 and decision block 144 indicate that all event packets should be transferred to the appropriate event consumer.

A single event may need to be transferred to multiple event consumers. In this case, the multiple event consumers may use a common transfer method or may use dissimilar transfer methods. In such a situation, local event processing block 70 must contact each event consumer and transfer the appropriate events. In FIG. 6, steps 142 and 144 would be repeated for each event consumer that needed to receive an event through an asynchronous transfer method.

If there are no event consumers that will receive the event packet through an asynchronous transfer method, or if there are additional event consumers that are to receive the event packet through a different transfer method, execution proceeds at decision block 146. Decision block 146 tests whether the local event consumer should receive notification via a polling transfer. As previously explained, it may be more efficient for certain event consumers to poll the local event processing block occasionally to identify whether events have happened that they should receive. In FIG. 6, if a polling transfer is identified then step 148 indicates that the event should be held for the event consumer. Holding an event packet for an event consumer may comprise holding the packet in memory or may comprise writing the packet to a data store. Such choices depend upon the particular implementation of the invention.

After all polling transfers have been accomplished for the event packet, then decision block 150 tests whether a disconnect transfer should be used for any event consumers. A disconnect transfer is a transfer method used to transfer events to event consumers that are currently not connected to the server. In a disconnect transfer, the event packet is written to an event store, such as event store 80 of FIG. 3. When the event consumer reconnects to the server, the event packets may be transferred using either an asynchronous transfer method or a polling transfer method. Step 152 indicates the saving of event packets in the event store.

As previously described, each event packet needs to be transferred to the appropriate event consumer. The flow diagram presented in FIG. 5 identified an event packet and transferred it to all appropriate event consumers, and then returned for the next event packet. Another way of accomplishing the same function is to transfer all appropriate event packets to a single event consumer before moving on to the next event consumer. Either way will work and simply depends on the particular implementation.

As previously described in conjunction with FIG. 5, after an event packet has been sent to all appropriate event consumers, it cannot always be removed from the event queue, such as event queue 64 of FIG. 3, if a common event queue is used for remote event processing block 66 and local event processing block 70. The event packet must be transferred both to the appropriate local event consumers and to the appropriate servers before the event packet can safely be removed from the event queue. As previously described, such a situation may be accomplished by tracking when the event packet has been transferred to the event consumers and when it has been transferred to the servers in order to identify when all appropriate transfers have taken place. Another method that will suffice is to utilize separate remote event queues and local event queues. The clean up and removal of transferred events from the event queue may be accomplished by implementing a separate clean up process or by allowing either remote event processing 66, or local event processing 70, or both to remove events that have had all appropriate transfers.

Figure 7:
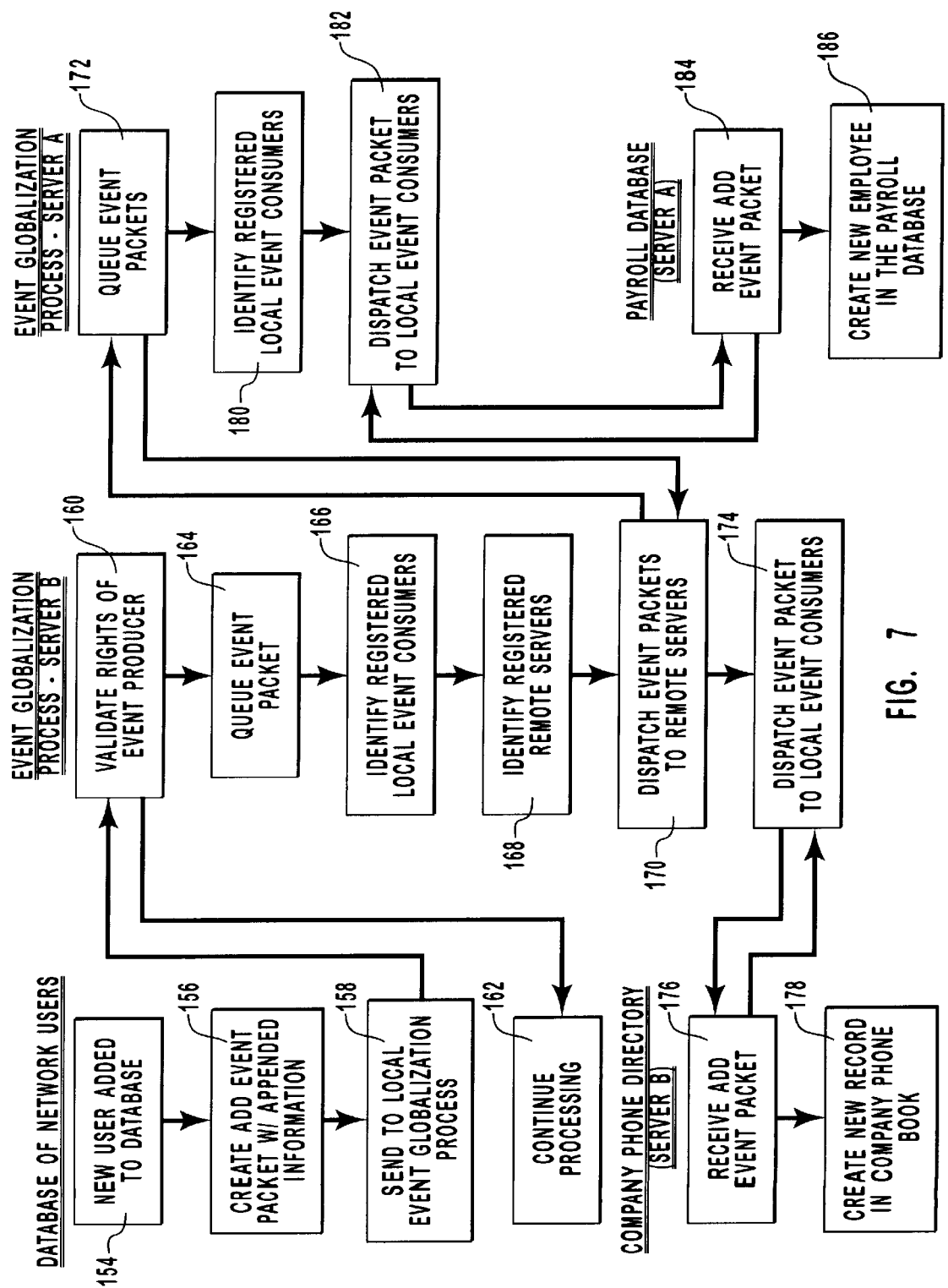
FIG. 7 is an example of how an "add user" event is processed in one preferred embodiment of the present invention.

Turning now to FIG. 7, an example of how the present invention works is presented. The network topology used for this example is presented in FIG. 1. Assume for this example that event producer 5 added a new user to a database stored on the network. Further, assume that event consumer 4 is a company phone directory that has registered to receive an "add user" event so that it can extract the phone number of the added user and place it in the company phone book. Further, assume that event consumer 1 is a payroll database that has also registered for the add user event so that information can be extracted to update the employee payroll database.

Referring now to FIG. 7, a new user is added to the database in step 154. Assume that the addition occurred on server B. After the user has been added to the database, step 156 indicates that an event packet is created. This event packet represents any prepackaging of the event data done by the database process itself. The database process itself may generate a complete event packet as described above, or the database process may create a partial event packet which is then packaged into a complete event packet later on by the event globalization process illustrated in FIG. 3.

After the event packet has been created, the event is sent to the local event globalization process. This is illustrated in FIG. 7 by step 158. The local event globalization process is the process described in FIGS. 3–6. Remember that each server in the network has a similar process running thereon. Step 160 indicates that the event globalization process on server B validates the rights of the event producer. This corresponds to steps 104 and 106 of FIG. 4. Notice that after the rights of the event producer have been validated, the database of network users may continue processing as shown by step 162. Meanwhile, the event notification process on server B queues the event packet in step 164. These steps illustrate one feature of the present invention. Because the event notification process operates as described, the event notification process may execute separately from the database of network users. Thus, the database may return to its processing tasks without sending event notifications to each and every registered user.

After the event packet has been queued, as for example in event queue 64 of FIG. 3, the registered local event consumers and registered remote servers are identified in steps 166 and 168. As described above in the embodiment in FIG. 3, these functions are performed by local event processing block 70 and remote event processing block 66 by checking local event registry 72 and global event registry 68 respectively. If the event notification process is multi-threaded, these two functions may be performed in parallel.

After the registered remote servers have been identified, step 170 dispatches the events to the remote servers. In this case, the only remote server registered for this event was server A. Thus, step 170 dispatches the events to the event globalization process running on server A. As the events are received, they are queued in the event queue on server A as indicated by step 172. At this point, the event notification process on server A and the event notification process on server B can proceed independently so that the servers are not tied up communicating with each other. Notice that server A did not validate the rights of server B. This illustrates that once the rights of an event producer are validated, they may not need to be revalidated when the event is sent to other servers. Of course, for network security reasons, server A may wish to verify that the event is coming from server B and not somewhere else.

After the events have been dispatched to the registered remote servers, the event notification process on server B dispatches the event packets to registered local event consumers. This is indicated in FIG. 7 by step 174. In this case, the only registered local event consumer is event consumer 4 which is the company phone directory process. As indicated by step 176, the event packet is received by the company phone directory and as indicated by the return arrow to step 174, processing could continue for the event notification process after transfer of the event packet. The event packet could be transferred to event consumer 4 using any of the previously identified event transfer methods or with another appropriate event transfer method. After the event has been transferred, the company phone directory process creates a new record in the company phone book as indicated by step 178.

Returning now to step 172 for the event globalization process on server A, after the events have been received from server B, server A proceeds to identify the registered local event consumers for this event. This is indicated in FIG. 7 by step 180. Again, the registered local event consumers are identified by checking the local event registry on server A. In this example, the only registered local event consumer on server A is event consumer 1.

In step 182, the event globalization process of server A transfers the event packet to the local event consumer which, in this case, is the payroll database process. The payroll database process receives the information as indicated by step 184 and proceeds to create a new entry in the employee payroll database as indicated by step 186.

This example illustrates another aspect of the present invention. Remote event processing block 66 of FIG. 3 only sends locally occurring events to other servers. If remote event processing block 66 sent both locally occurring events and event received from other servers, the event notifications would propagate endlessly in the network resulting in an endless number of duplicate notifications. Thus, server A only sends the event received from server B to its local event consumers.

In summary, the present invention discloses a system in method for global event notification and distribution that provides a robust environment with many benefits and advantages over the prior art. The present invention globalizes events by transferring them both to registered local event consumers and registered remote servers. Event consumers can globally register for a particular event by simply registering locally. The event globalization process then takes care of placing appropriate entries in the appropriate event registries to achieve the desired notification. The present invention prevents duplicate event notifications for replicated events. The present invention also provides for multiple levels of filtering which allow an event consumer to eliminate notification of events having little or no interest for the event consumer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer network comprising an event producer and and event consumer, a method for allowing said event producer to direct a local event to said event consumer in the absence of a common server, comprising the steps of:

a) generating an event packet comprising an event type and an intended event consumer;

b) checking a first registry resident to said event producer, said first registry comprising a list of local event consumers and an associated list of event types in order to identify which local event consumers are registered for events of the type included in said event packet; and c) transferring said event packet to said event consumer when said event consumer matches said intended event consumer.

2. In a system for globalizing events, a method of privatizing a broker comprising the steps of:

a) storing a global event registry comprising a list of events and a corresponding list of brokers in order to identify which of said brokers should receive which events on said broker;

b) when one of an event producer and event consumer attempt to register with said broker, identifying registration criteria from said global event registry to register with said broker; and c) when characteristics of said one of event producer and event consumer are incompatible with said registration criteria, denying registration to said one of event producer and event consumer.

3. In a computer network implementing a global event system, a method of receving a response to an event, comprising the steps of:

a) said event producer initiating a query event to a broker of said event producer;

b) said broker of said event producer identifying said event consumer from said one of a field within said query event and a registration for said event consumer with in a global event registry;

c) transferring said query event to said event consumer; and d) said event consumer transferring said response to said query event to said event producer.

4. In a computer network implementing a global event system comprised of a local server, a remote server registered as an event consumer of a new registration event and a global event registry, a method of updating said remote server when an event is registered at said local server, comprising the steps of:

a) updating a local copy of said global event registry in said local server;

b) updating said global event registry;

c) said local server producing said new registration event;

d) said local server identifying new registration event consumers from said local copy of said global event registry;

e) transferring said new registration event to said remote server; and f) said remote server updating a local copy of said global event registry from said global event registry.

5. In a network system for globalizing events comprised of an event producer, an event consumer and a global registry listing said event consumer as a registered event consumer of an event type, a method of filtering events at said event consumer, comprising the steps of:

a) identifying filtering criteria at said event consumer;

b) transferring by said event producer an event to said event consumer in response to a match of said event type in said global registry when said event producer issues said event having said event identifier; and c) filtering said event from said event consumer when said event matches said filtering criteria at said event consumer.

6. In a computer network having a plurality of brokers employing a global event registry, a method of implementing a global event system among said plurality of brokers using free-form syntax for defining registration criteria, comprising the steps of:

a) generating said free-form syntax by said one of event producer and event consumer to describe said registration criteria;

b) storing said free-form syntax in said global event registry;

c) comparing characterisics of an event with said free-form syntax when said event is received; and d) when said free-form syntax of said global event registry matches said characteristics of said event, transferring said event to said one of an event producer and event consumer corresponding to said free-form syntax in said global event registry.

7. In a computer network comprised of a broker, an event producer, an event consumer and a global event registry, a method of implementing addressing of events between an at least first and second event buffers of said broker, comprising the steps of:

a) one of said event producer and said event consumer registering at said global event registry with a preference for one of said at least first and second event buffers;

b) when an event occurs, transferring said event to said broker of said event consumer;

c) said broker of said event consumer identifying said said one of said preference of said at least first and second event buffers for said event from said global event registry; and d) said broker of said event consumer storing said event in said one of said at least first and second event buffers corresponding to said preference.

8. In a system for globalizing events occurring at one server in a network to other servers in the network, the method comprising the steps of:

a) associating information with the event to be globalized, said information remaining with the event so that other servers in the network may identify certain characteristics of the event from that information;

b) monitoring said information with said server to compare that information with preselected criteria on the server for conditions such as time of initiation of the event, duration of the event, and limitations upon who may receive the event; and c) expiring the event if the information associated with the event falls outside the server criteria.

9. A method of globalizing events as set forth in claim 8, wherein the information associated with the event contains information regarding the encryption of the event and wherein the criteria associated with the server is a public key.

10. A method of globalizing events as set forth in claim 8, wherein the information associated with the event contains information regarding the encryption of the event and wherein the criteria associated with the server is public certificate verification technology.

11. In a computer network comprising an event producer, an event consumer, a server, and a function registrar, a method for allowing several event producers and consumers to access a single function in the function registrar, the method comprising:

a) generating an event from an event producer requesting a function;

b) receiving the event from the event producer by the server;

c) recognizing information associated with the event indicating that the event should be routed to a function registrar;

d) forwarding the events to the function registrar;

e) activating the event within the function registrar; and f) forwarding the event with the now executed application to an event consumer.

12. A method as set forth in claim 11, wherein the event producer and event consumer are not the same workstation.

13. A method as set forth in claim 11, wherein the event is a spell check request, and the application in the application registrar is a spell checker.

14. A method as set forth in claim 11, wherein the event is a disk fault in the application in the application registrar is a command to purge all deleted files to recover disk space.

15. A method as set forth in claim 11, wherein the event itself triggers the routing to the application registrar.

* * * * *

UNITED STATES PATENT AND TRADEMARK OFFICE
CERTIFICATE OF CORRECTION

PATENT NO. : 6,185,613 B1
APPLICATION NO. : 09/080364
DATED : February 6, 2001
INVENTOR(S) : Todd C. Lawson et al.

It is certified that error appears in the above-identified patent and that said Letters Patent is hereby corrected as shown below:

In Column 4, line 50, after "send" delete "even" and insert -- event --, therefor.

In Column 13, line 51, after "registries" delete "24" and insert -- 34 --, therefor.

In Column 14, line 64, after "producer" delete "46" and insert -- 42 --, therefor.

In Column 17, line 36, after "block" delete "60" and insert -- 66 --, therefor.

In Column 21, line 14, after "supports" delete "to".

In Column 22, line 26, after "and" delete "locally net" and insert -- local event --, therefor.

In Column 23, line 48, after "of" insert -- local --.

In Column 25, line 1, after "transfers" delete "to".

In Column 26, line 30, before "may" delete "filter" and insert -- filters --, therefor.

In Column 29, line 33, after "and" delete "event" and insert -- events --, therefor.

In Column 29, line 39, after "system" delete "in" and insert -- and --, therefor.

In Column 30, line 27, after "of" delete "receving" and insert -- receiving --, therefor.

UNITED STATES PATENT AND TRADEMARK OFFICE
CERTIFICATE OF CORRECTION

PATENT NO. : 6,185,613 B1
APPLICATION NO. : 09/080364
DATED : February 6, 2001
INVENTOR(S) : Todd C. Lawson et al.

It is certified that error appears in the above-identified patent and that said Letters Patent is hereby corrected as shown below:

In Column 31, line 14, after "comparing" delete "characterisics" and insert -- characteristics --, therefor.

In Column 31, line 33, after "identifying" delete "said".

In Column 32, line 32, after "forwarding the" delete "events" and insert -- event --, therefor.

In Column 32, line 42, after "fault" delete "in" and insert -- and --, therefor.

Signed and Sealed this

Twenty-eighth Day of October, 2008

JON W. DUDAS
*Director of the United States Patent and Trademark Office*